Patented Oct. 18, 1927.

1,645,517

UNITED STATES PATENT OFFICE.

JOSEPH BETHENOD AND EMILE GIRARDEAU, OF PARIS, FRANCE.

HIGH-FREQUENCY ALTERNATOR.

Application filed August 29, 1921, Serial No. 496,553, and in France July 9, 1919.

(GRANTED UNDER THE PROVISIONS OF THE ACT OF MARCH 3, 1921, 41 STAT. L., 1313.)

Figure 1:
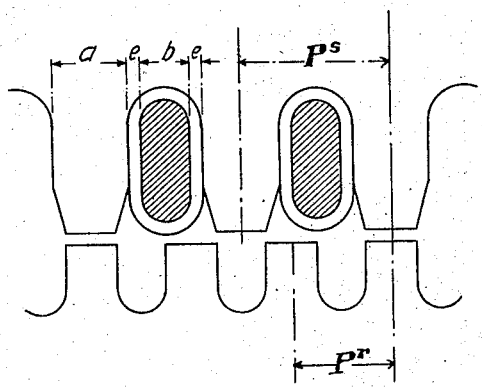
Figure 2:
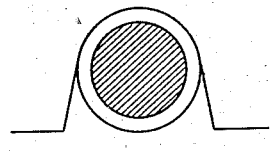

It is the object of the present invention to improve the shaping of the profile of the teeth of a high frequency alternator. My invention is illustrated in the two figures of the accompanying drawing, in which Fig. 1 represents one arrangement according to my invention, and Fig. 2 represents a modification thereof.

The present invention is an improvement on the high frequency alternator described in the application of Bethenod and Girardeau, Serial No. 496,552, filed August 29, 1921. That application describes a high frequency alternator, either of the variable impedance or homopolar type, having a determined harmonic of its fundamental wave accentuated at the expense of the fundamental. In this manner the output frequency of the machine is determined by the frequency of the chosen harmonic instead of the frequency of the fundamental, thereby increasing considerably the output frequency of the machine. This is accomplished by dimensioning the rotor and stator teeth in accordance with the formula $d=\dfrac{p}{2\,q}$, in which $d$ equals the width of rotor and stator teeth, $p$ is the stator pitch and $q$ is the order of the chosen harmonic. It is explained that by thus dimensioning and spacing the stator and rotor teeth the amplitude of the chosen harmonic will be very much greater than the amplitude of the fundamental wave. By filtering out the fundamental by any desirable means the frequency of the harmonic can be used as the output frequency of the machine.

It is further explained that by forming a composite machine consisting of a single stator and a composite rotor consisting of a single drum on which were mounted teeth for a plurality of rotors, the teeth of the several rotors being so spaced as to make a phase displacement in their respective outputs equal to $\dfrac{2\pi}{q}$, in which $q$ as before represents the order of the chosen harmonic, the amplitude of the chosen harmonic will be still further increased and the normal fundamental will be practically eliminated.

The present invention consists essentially of an improvement in this latter type of composite machine. The harmonic usually chosen in practice is that of the third order and obviously a machine designed for this harmonic frequency would necessarily have three rotor teeth to one stator tooth in the case of the variable impedance type, and three rotor teeth to two stator teeth in the case of the homopolar type. It is essential that the width of the stator and the rotor teeth at the air gap be equal to each other, from which it follows that the slots of the stator would be considerably wider than the stator teeth. The present invention concerns a redimensioning of the stator teeth so that the efficiency of the machine will be increased by decreasing the losses due to Foucault currents and hysteresis.

It has been found that in electrical machines comprising an inductive winding in the notches, the maximum efficiency of the machine is attained when the width of the copper in the notch plus the thickness of the insulator is equal to the width of the iron plus the insulator. In the particular case of high frequency machines, this condition prevails to a greater extent because the electromotive force passes rapidly through a maximum in proportion to the differences in the fluxes passing in two successive notches of the stationary member, the tooth of the stationary member opposite a tooth of the rotary member being saturated.

The above mentioned dimensions hold good for a machine in which the iron losses due to the reaction flux are not taken into consideration. If such losses are taken into consideration, the best dimensions are obtained with copper of even lesser thickness than iron ($b<a$), the losses, even when the machine is under load, being almost entirely in the iron.

Referring now to Fig. 1 of the drawing which, by way of example, illustrates a high frequency alternator of the homopolar type, designed to increase the amplitude of the third harmonic at the expense of the amplitude of the fundamental wave, S represents the stator and R represents the rotor. $P_s$ represents the stator pole pitch and $P_r$ the the rotor pole pitch, and as indicated in the figure, the ratio of rotor teeth to stator teeth is 3 to 2. The width of the copper in the notches between stator teeth is represented by $b$; the thickness of the insulation by $e$, and the width of the stator teeth by $a$. In order to increase the amplitude of the third harmonic of a composite machine of this type, it is necessary that the teeth of the rotor comprise three distinct sets of teeth forming, in effect, three separate rotors all co-acting with a single set of teeth on the stator. In the homopolar machine, moreover, it is necessary that there be two stator teeth to each three rotor teeth. As the width of the rotor and stator teeth must be same at the air-gap, and as the width of the rotor teeth and slots are made equal in practice, it is obvious that such an arrangement would result in a stator having slots considerably wider than its teeth. But as explained above it has been found that in order to obtain the best efficiency for a machine as well as to conserve material, the stator slots should be approximately equal in width to the stator teeth. This efficiency is obtained by sloping the side faces of the stator teeth, thereby causing them to increase in width a short distance from the air-gap. The inclination of the side faces of the teeth is so chosen that throughout the greater extent of their length the stator teeth are approximately equal in width to the stator slots as can be clearly seen from Fig. 1 of the drawing. Such a machine, while conserving all the advantages of the high frequency alternator described in the application referred to above, is in addition of very high efficiency.

In Fig. 2 of the drawing is illustrated a modified form of stator winding and slots. In this form the stator winding consists of a round conductor or cable placed in the stator slots. In this form the inclination of the sides of the stator teeth is so chosen that they are tangent to the round surface of the conductor or cable. While this form is not as desirable as the preferred form shown in Fig. 1, it is much more desirable than the form shown in the previous application.

It will be seen that by means of this arrangement, the average width of the tooth is such as to correspond to the best distribution of the losses, between iron and copper, and thus correspond to the best utilization of the machine. The particular advantages attained by such arrangement of the teeth are; a decrease of losses by Foucault currents and hysteresis; an increase of the maximum ordinate of the unloaded characteristic of the machine, and finally a decrease of losses due to the reaction flux.

The arrangement of the teeth forming the object of the present invention may be generally applied to machines having rotating poles irrespective of the method of starting employed, such as ordinary homopolar machines, or machines with internal starting. While the invention has been explained by way of example as applied to a homopolar machine it is obvious that it will be applied equally well to a machine of the variable impedance type.

Having described our invention, what we claim is:—

1. In a high frequency alternator, a rotating member slotted at the periphery to form teeth thereon and a stator member slotted to form teeth thereon, said stator having a lesser number of teeth than the rotor and said stator teeth having a winding interposed therebetween and having a width at least as great as the width of the windings thereon and the teeth of both members having the same width at the air gap.

2. In a high frequency alternator, a slotted rotating pole member having teeth and slots of substantially the same width, a slotted stator member having windings in the slots and having less teeth than the said rotor, the width of said stator teeth being greater than the width of said rotor teeth, and said stator teeth having sides inclined to provide an end of substantially the same width as the rotor teeth.

3. A high frequency alternator comprising a rotor member and a stator member, each slotted to form teeth thereon, one of said members having a winding interposed between its teeth and having a smaller number of teeth than the other member, the teeth of both members having the same width at the air gap and the teeth of the winding carrying member having an average width at least as great as the width of the winding between adjacent teeth.

4. A high frequency alternator comprising a rotor member and a stator member, each slotted to form a plurality of teeth, the number of teeth on said members being different and the ratio of the number of teeth on the two being not greater than 2:3 the width of the teeth on both members being equal at their outer extremities and those on the member having the smaller number being of a varying cross section to make their average width at least as great as the width of the intervening slots.

5. A high frequency alternator comprising a toothed rotor member and a toothed stator member, one of said members being provided with windings in slots intermediate said teeth and having a smaller number of teeth than the other member, the teeth of both members having the same width at the air gap and the teeth on the winding carrying member having a varying cross section to make their maximum width at least as great as the maximum width of the windings in the slots.

6. In a high frequency alternator, a stator and a rotor, a plurality of teeth on said stator and an unequal and greater number of teeth on said rotor co-acting therewith, the width of teeth on said rotor being equal to the width of the intervening slots, the width of the stator teeth at the air-gap being equal to the width of the rotor teeth and the sides of said stator teeth being inclined to make the average width of the stator teeth at least as great as the width of the stator slots.

7. In a high frequency alternator, a stator and a rotor, a plurality of teeth on said stator and an unequal and greater number of teeth on said rotor co-acting therewith, the width of teeth on said rotor being equal to the width of the intervening slots, the width of the stator teeth at the air-gap being equal to the width of the rotor teeth and the width of the stator teeth at their base being at least as great as the width of the stator slots.

8. A high frequency alternator comprising a stator, teeth on said stator so spaced as to form slots substantially equal in width to the width of said teeth, a winding in said slots, a composite rotor comprising an unequal and greater number of teeth than on said stator, said rotor teeth being so spaced as to make the slots equal in width to the width of the teeth, said stator teeth being bevelled to make their width at the air-gap equal to the width of the rotor teeth.

JOSEPH BETHENOD.
EMILE GIRARDEAU.